United States Patent [19]
Conners et al.

[11] Patent Number: 5,908,263
[45] Date of Patent: Jun. 1, 1999

[54] EMBEDDED LIGHT FIXTURE PREFORM FOR POURED CONCRETE STRUCTURES

[75] Inventors: Thomas Patrick Conners, Reno; Eric Petrilla, Incline Village, both of Nev.

[73] Assignee: Concrete Paving Innovations LLC, Sparks, Nev.

[21] Appl. No.: 08/992,201

[22] Filed: Dec. 17, 1997

[51] Int. Cl.⁶ .................................. E01F 9/00; F21S 1/02
[52] U.S. Cl. ........................ 404/9; 362/153; 362/153.1
[58] Field of Search ........................... 404/9, 13, 22, 404/23, 25, 26; 362/145, 153.1, 153, 364, 365, 375; 174/48, 50, 58; 220/3.3, 3.6, 3.8, 3.4; 52/220.5, 220.8, 28

[56] References Cited

U.S. PATENT DOCUMENTS

| | | | |
|---|---|---|---|
| 2,332,362 | 10/1943 | Bartow | 362/311 |
| 3,211,824 | 10/1965 | Heiman | 174/48 |
| 3,471,987 | 10/1969 | Yelsma | 52/684 |
| 4,396,972 | 8/1983 | Kaneko et al. | 362/145 |
| 4,697,950 | 10/1987 | Copeland | 362/153.1 X |
| 4,992,914 | 2/1991 | Heiss et al. | 362/153.1 |
| 5,088,246 | 2/1992 | Brown | 52/127.8 |
| 5,156,454 | 10/1992 | White | 362/365 X |
| 5,420,376 | 5/1995 | Rajecki et al. | 174/48 |
| 5,467,565 | 11/1995 | Bowman et al. | 52/220.1 |
| 5,627,340 | 5/1997 | Smith et al. | 174/48 |
| 5,681,105 | 10/1997 | Nau | 362/153 |
| 5,779,349 | 7/1998 | Reinert, Sr. | 362/153.1 |

*Primary Examiner*—Tamara Graysay
*Assistant Examiner*—Sunil Singh
*Attorney, Agent, or Firm*—Townsend & Townsend & Crew LLP

[57] ABSTRACT

A void-forming preform for installing a light fixture in a pavement, such as a poured concrete slab, or other structure comprises an upper chamber for receiving the light fixture, a ledge for supporting the light fixture, and a lower chamber for holding a length of wiring entering the lower chamber through a port. In a further embodiment, adjustable standoffs are formed in the bottom of the preform. The standoffs may be bent down to provide support for the preform on a pavement base prior to forming the pavement, and allow easy and fine adjustment of the height of the preform in relation to the final grade of the pavement.

16 Claims, 3 Drawing Sheets

EMBEDDED LIGHT FIXTURE PREFORM FOR POURED CONCRETE STRUCTURES

BACKGROUND OF THE INVENTION

The present invention relates to a receptacle box for use in a pavement or similar structure. More specifically, the present invention relates to a void-forming box, or preform, that can be embedded in a poured concrete pavement or similar structure to accept and support a light fixture.

Pavements are made from a variety of materials, including asphalt, concrete, brick, and gravel, for a variety of purposes, such as roadways, runways, driveways, sidewalks, patios, and so forth. In many situations, it is desirable to provide illumination on the surface of the pavement, to illuminate a centerline or an edge of the pavement, for example. Pavements are illuminated with both reflective and active devices. Reflective devices, such as reflective paint or reflectors, reflect light from an light source, such as a car's headlamps. Reflective devices are relatively inexpensive, easy to apply, and robust. However, reflective devices must be illuminated by an external light source and often provide reflective illumination over only a narrow viewing angle.

Active devices have a light source, such as a lamp or fiber optic cable, that emits light. While active devices do not rely on an external light source, active devices require some sort of power to be delivered to, or contained within, the device. The power lines that deliver power to active devices usually run beneath the surface of the pavement. This protects the power lines against damage from the traffic on the surface of the pavement and provides a smooth pavement surface.

One active system for use with asphalt pavements, such as airport runways, runs power lines through a slot cut in the pavement to a lamp that is placed in a divot that is chipped out of the pavement. The slot is then filled with a sealing material. Such a system is limited in utility as the lamps are typically small so that they may sit within the divots and be protected from the weight of the tires. These types of systems are not generally used in concrete or brick pavements because of the difficulty of forming the slots and divots.

Another system uses fiber optic cable to distribute light from a lamp near the pavement to bricks or paving blocks that have a hole drilled through the brick and a small lens on the surface of the brick. The fiber optic cable is brought to the backside of the brick and optically coupled to the lens to provide a small dot of light on the surface of the brick. Unfortunately, this system is impractical for use with formed-in-place pavements, such as poured concrete pavements, because any repair or replacement of a part often requires the use of a jackhammer or sledgehammer to destroy the pavement in order to gain access to the part, and then the pavement must be repaired.

Conventional electrical receptacles, junction boxes, pull boxes, and similar devices exist for forming voids in poured concrete structures, such as floors of buildings, but are unsuitable for accepting and supporting light fixtures for several reasons. A common problem with such devices is the labor and total process time required to set the devices to grade. Typically, such devices are set to grade using a wet-set technique or a trimming technique. The wet-set technique involves pouring a patty of concrete at the intended location of the receptacle and pressing the receptacle into the concrete until the receptacle is at the proper grade. This is a time consuming and labor-intensive process that requires mixing and pouring of concrete before the slab may be poured, and does not allow fine adjustment of the height of the receptacle. Preforms used in trimming techniques typically extend above the height of the intended slab. The preform is set to an approximate height, and the excess is trimmed off after the slab is poured. This technique is also time consuming, and does not provide accurate control of the depth of the void.

Controlling the depth of the void is important when a preform is intended to accept a subsequent component of a particular height, such as a light fixture, because the component may stick out of, or be sunk below, the pavement if the height of the preform is not accurately controlled. Furthermore, conventional receptacles and preforms typically have no means to support a light fixture, have structures that would interfere with insertion of a component, such as screw tabs or seating rims, and do not provide any storage space for coiling wire to allow the light fixture to be removed and serviced.

Therefore, a device or system allowing illuminating devices to be installed in formed-in-place pavements is desirable. It is further desirable that any such device or system provide support for the traffic passing over the pavement, and allow access to the device for maintenance or replacement.

SUMMARY OF THE INVENTION

The present invention provides a void-forming preform for use in pavements and similar structures. The preform includes a shell having vertical sidewalls and a bottom, the shell being strong enough to maintain a void as the pavement or other structure is being formed around it. The preform also includes an inner wall within the shell and having substantially vertical sidewalls. A ledge extends substantially horizontally from an upper region of the inner wall to define an upper chamber and a lower chamber within the shell. A port provides entry into the lower chamber through the shell and the inner wall. In one embodiment, the preform is bent from aluminum sheet metal. In a further embodiment, the bottom of the shell includes standoffs that may be bent down to form legs that support the preform on a base while the pavement is being formed. In a yet further embodiment, the standoffs are scored so that a tab may be broken off the standoff and shorten its length.

These and other embodiments of the present invention, as well as its advantages and features are described in more detail in conjunction with the text below and attached figures.

DESCRIPTION OF THE SPECIFIC EMBODIMENTS

The present invention relates to a void-forming preform for use in pavements or similar structures. In particular, the invention relates to an adjustable preform for use with poured concrete and other pavements that accepts and supports a removable light fixture, is adjustable to grade, and provides access to the power lines associated with the light fixture. In a specific embodiment, the preform accepts an illuminated paving block that is capable of supporting vehicular traffic loads. Such an illuminated paving block is described in co-pending and co-assigned U.S. patent application Ser. No. 08/837,534 entitled INTERLOCKING PAVING BLOCK WITH INTERIOR ILLUMINATION CAPABILITY by Conners and Petrilla, filed Apr. 21, 1997, herein incorporated by reference for all purposes. The preform has a chamber compatible with illuminated paving blocks intended for use with standard interlocking pavers, and the preform has adjustable legs, or standoffs, that are used to set the top of the illuminated paving block at grade prior to forming the pavement.

Figure 1:
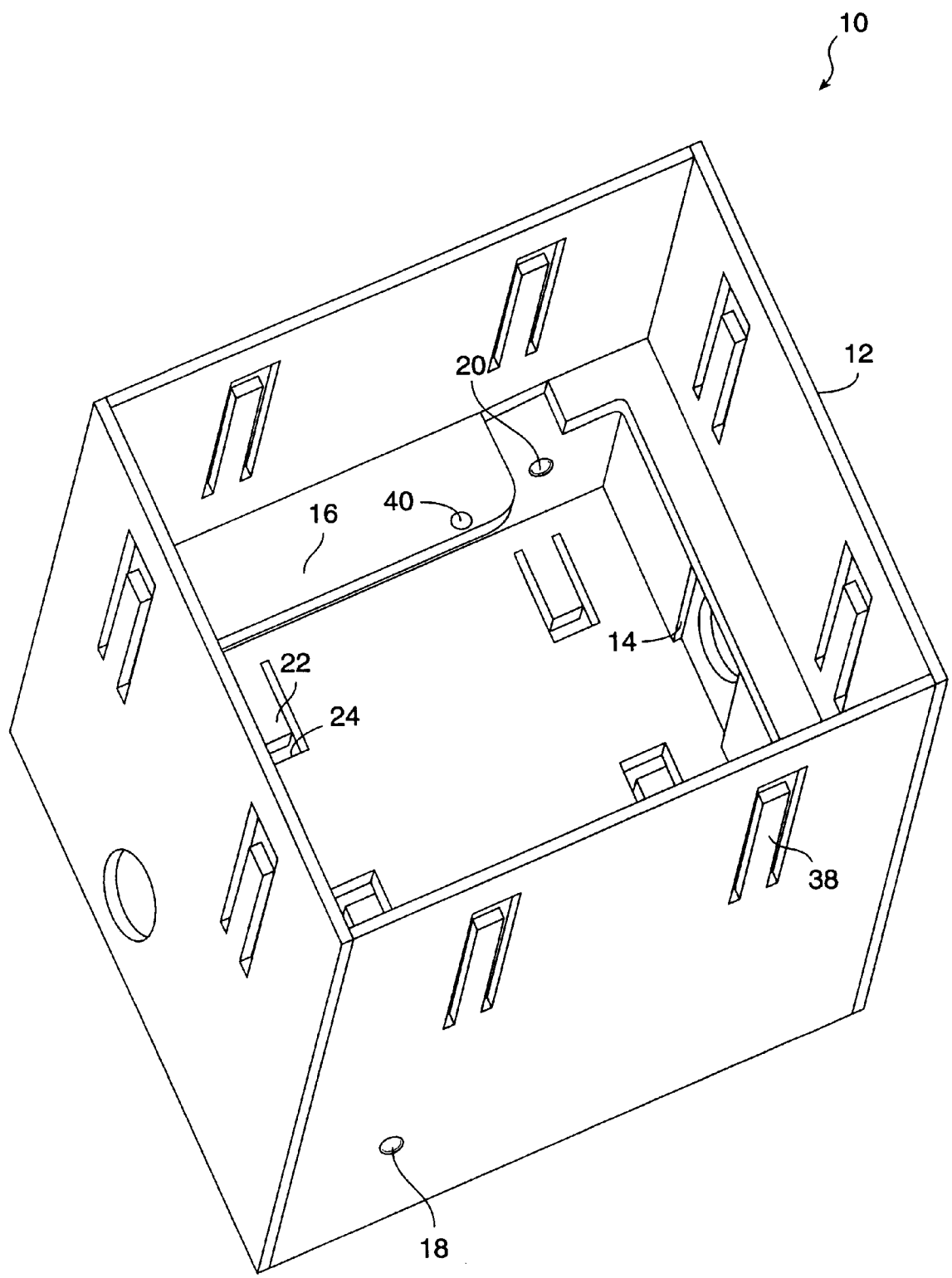
FIG. 1 is a simplified isometric view of a light fixture preform according to an embodiment of the present invention.

FIG. 1 is a simplified isometric view of a light fixture preform 10 according to one aspect of the present invention. The preform is made from aluminum sheet. An outer wall 12, or shell, is 0.050 inches thick and an inner wall 14, including an interior ledge 16 is 0.090 inches thick. The outer wall 12 is approximately 3½ inches high, which is the nominal height of a so-called "4-inch" slab, and the nominal width of a so-called "2×4". The top area of the preform shown in FIG. 1 is nominally 6"×6" square, but could be other dimensions, such as a 4"×8" rectangle or an octagon. The specific dimensions are given as examples only.

The inner wall and ledge are connected to the outer wall with spot welds 18, 20, but could be connected using other means, or not connected at all. This material in this thickness provides support for the light fixture (not shown) for use in pedestrian and vehicular pavements, and provides an outer wall 12 strong enough to maintain the desired shape during formation of a concrete slab. It is understood that other materials, such as galvanized steel, could be used, but aluminum is more resistant to corrosion when in contact with concrete and also is galvanically compatible with aluminum-based light fixtures.

Adjustable standoffs 22 are provided in the preform base 24 to set the preform at the proper grade (e.g. height above the pavement base or native dirt) before pouring the slab. The adjustable standoffs 22 of the preform may be folded down and pressed into the underlying native dirt or other pavement base (not shown) as the operator sets out the preforms. The preforms are easily raised or lowered to the final proper height after all preforms are in place by either pulling or pushing the preform, or by bending the standoffs at a different angle to the preform base 24. The adjustable standoffs may be left un-bent and used to tie the preform to steel mesh or to steel re-enforcement bar ("re-bar"). For example, the preform may be used in a concrete structure not poured over a gravel or dirt base, such as the upper floors or ramps of a parking garage.

Figure 2:
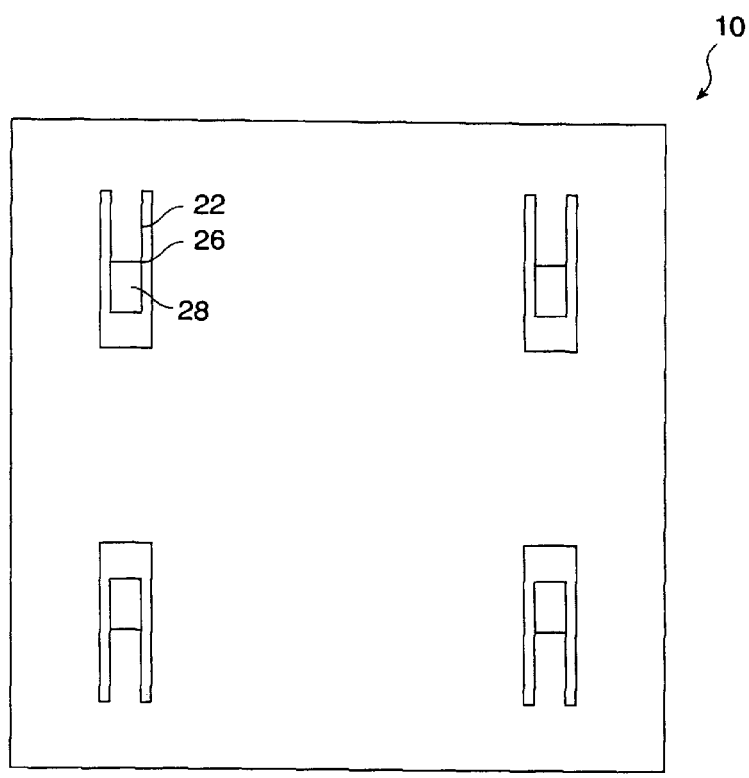
FIG. 2 is a simplified bottom view of the light fixture preform of FIG. 1 showing additional features.

FIG. 2 is a simplified bottom view of the preform 10 showing a further feature of the adjustable standoffs 22. The adjustable standoffs are nominally 6 inches long and include a scored section 26 so that a 2 inch tab 28 may be broken off, leaving 4 inches of the adjustable standoff.

Figure 3A:
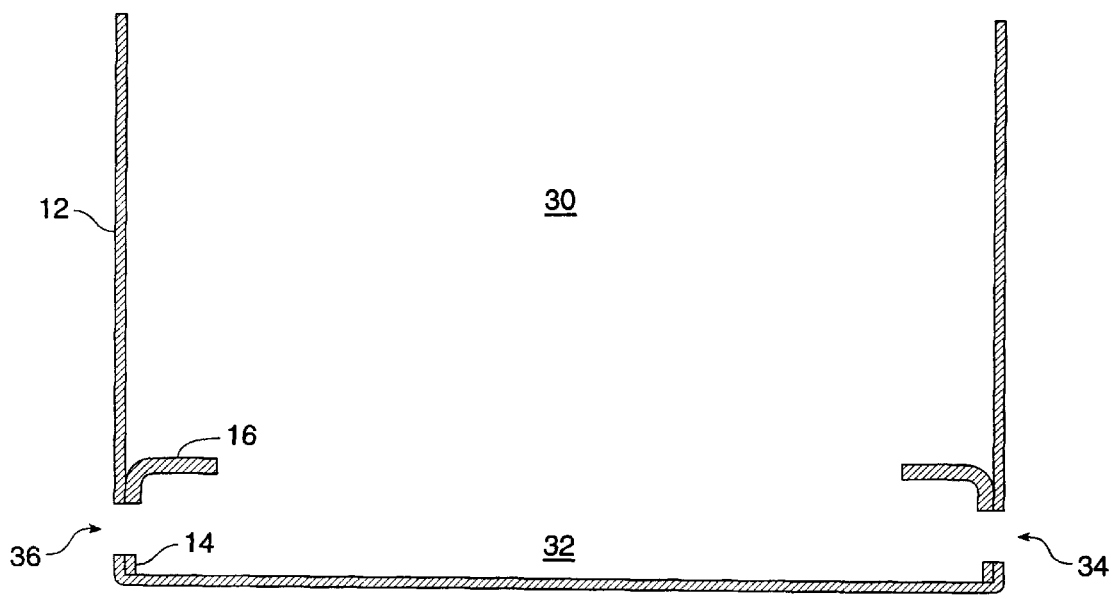
FIG. 3A is a simplified cross section of a preform according to an embodiment of the present invention.

FIG. 3A is a simplified cross section of a preform. The interior ledge 16 separates the preform into an upper chamber 30 and a lower chamber 32. The upper chamber will receive the illuminated block (not shown), while the lower chamber provides a space to run the electrical wires (not shown) or other utilities to the illuminated block or other component. Sufficient space is provided in the lower chamber to coil a length of wires so that the light fixture may be easily removed from the preform. A port 34 is provided through both the outer wall 12 and inner wall 14 to allow entry of the wires or other utilities into the lower chamber 32. A second port 36 is also provided so that the wires may be strung through the preform in series. Both ports are ¾ of an inch in diameter to accept a ½ inch conduit nipple (not shown). Providing conduit to the preform allows wires to be pulled to or through the preform after the pavement has been formed without ripping up the pavement; however, it is not necessary to use conduit with the preform.

Figure 3B:
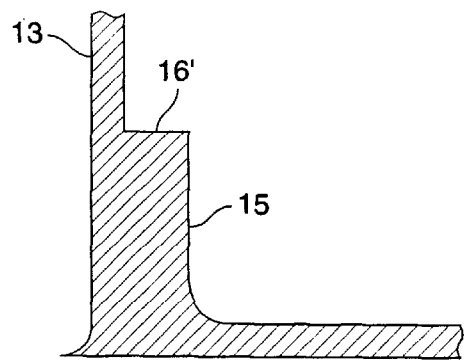
FIG. 3B is a simplified cross section of a portion of a molded or cast preform according to another embodiment of the present invention.

FIG. 3B is a simplified cross section of a portion of a preform that is cast or molded from metal or plastic, including reinforced plastic. An outer wall 13, or shell, is integrally formed with the inner wall 15. The top of the inner wall forms a ledge 16' to support an illuminated block or other device. Alternatively, a molded or cast inner wall could be placed inside a sheet metal shell, or a metal inner wall could be placed in a plastic shell. In any configuration, the ledge separating the upper chamber from the lower chamber may be formed by the upper horizontal surface of the inner wall, and need not extend beyond the inner vertical surface of the inner wall.

Referring again to FIG. 1, the outer wall 12 has tabs 38 that may be bent down or left up and used to tie the preform 10 to reinforcing structures or stakes, to hold the preform in place during slab formation. When using the preform in a poured slab, all of the tabs are typically bent down at an approximate right angle to the wall of the preform, but it is not necessary to bend all or any of the tabs down. The bent tabs help to stabilize and anchor the preform in the wet concrete while the concrete is being consolidated, by vibration, for example, and floated out or otherwise surfaced. If the tabs are not bent down, the preform has more of a tendency to move in relation to the poured concrete. Of course, the preform may be used in other structures, such as step faces, side walls, asphalt pavements, interlocking paver or brick pavements, gravel pavements, and lawns. Mounting holes 40 are provided to secure the light fixture to the preform when the preform is used in a step face or side wall, which would put the open face of the preform in a vertical orientation. A self-tapping screw (not shown) may be inserted through a corresponding oversize hole in the light fixture (not shown).

Figure 4:
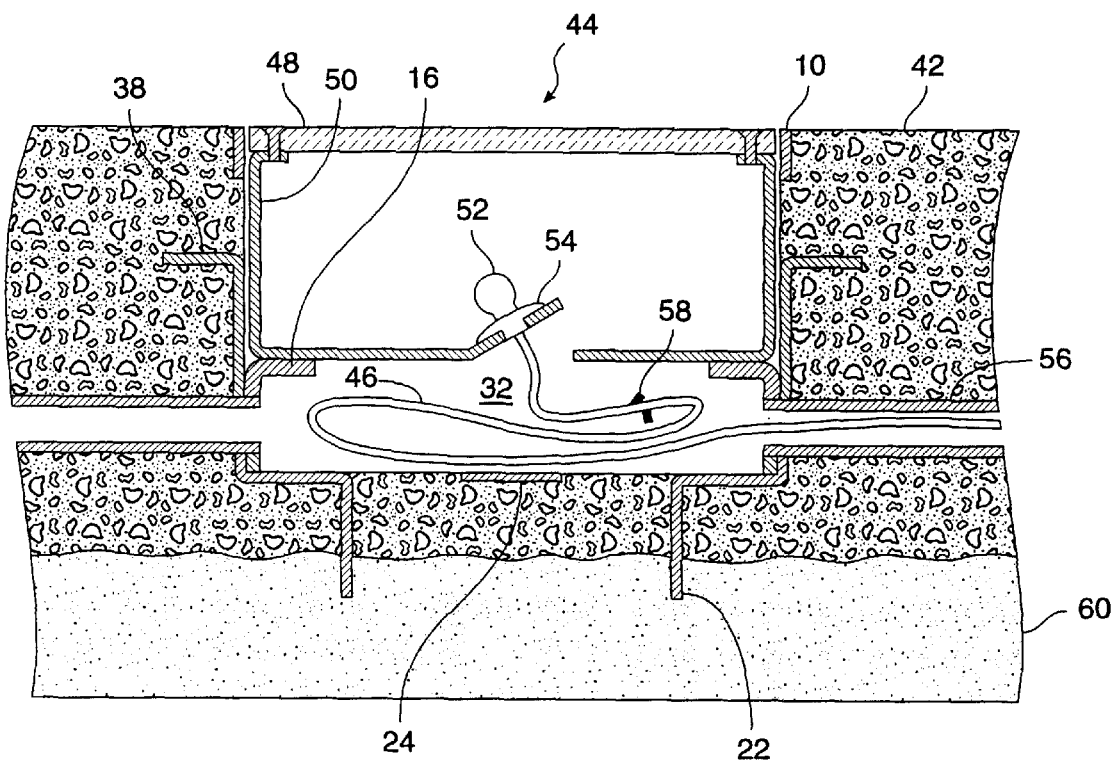
FIG. 4 is a simplified cross section of a preform installed in a pavement with a light fixture installed in the preform.

FIG. 4 is a simplified cross section of a preform 10 in a concrete slab 42. An illuminated block 44 sits on the interior ledge 16, and a loop or coil of wire 46 is stored in the lower chamber 32, allowing the illuminated block to be easily removed from and placed into the preform. The illuminated block 44 has a light-transmissive lens 48 attached to body 50 of aluminum sheet metal. A lamp 52 in a light socket 54 is connected to the wires 46 with wire nuts 58 or other means to receive electrical power for illuminating the block. The wires 46 run through conduit 56 within the concrete slab 42, although the conduit is not necessary. Additional wiring (not shown) may be run through the conduit and through the preform to other illuminated blocks or other devices. Other types of illuminated blocks or light fixtures, such as molded illuminating bricks, may be used with the preform. The preform, particularly the inner wall, is strong enough to support structural illuminated blocks, i.e., blocks that are capable of withstanding loads generated by vehicular traffic, such as cars, trucks, airplanes, and the like. However, the preform may be used with other components that are not strong enough to support vehicular loads, such as decorative or non-structural light fixtures.

The concrete slab 42 has been formed on a pavement base 60 of sand, gravel, dirt, or similar material. The standoffs 22 have been bent down from the preform base 24 and pushed into the pavement base 60 to adjust the height of the preform to grade prior to pouring the concrete. The tabs 38 have been bent down to anchor and stabilize the preform in the concrete, especially during the pouring and finishing operations. To keep concrete out of the interior of the preform when the concrete is poured, a wooden block (not shown) or similar member, such as a light fixture or light fixture shell, may be placed in the preform, or the top of the preform may be temporarily taped over. If a light fixture shell is used, the lens and any trim is typically removed from the light fixture and the shell is placed in the preform upside down, and tape is applied over the top of the light fixture shell and preform to keep the interior of the preform clean.

In an alternative embodiment, the height of the outer wall of the preform is lower and the preform is set so that the top of the preform is slightly below grade and the top of the illuminated block is at grade. This obscures the edge of the preform in the finished pavement.

While the above is a complete description of specific embodiments of the present invention, various modifications, variations, and alternatives may be employed. For example, the light fixture may be made of plastic or other material, or the preform may accept a device other than a light fixture. While the preform has been described in a poured concrete slab, the preform could be used in an asphalt pavement, gravel pavement, lawn or turf, or other application. Other variations will be apparent to persons of skill in the art. These equivalents and alternatives are intended to be included within the scope of the present invention. Therefore, the scope of this invention should not be limited to the embodiments described, and should instead be defined by the following claims.

What is claimed is:

1. A void-forming device for immersion in a solid medium, the device comprising:
   a shell having a plurality of first sidewalls extending orthogonally from a bottom, the shell suitable for forming a void in a surrounding medium;
   an inner wall having a plurality of second vertical sidewalls substantially parallel to the first sidewalls, the inner wall being disposed within the shell;
   a ledge extending substantially laterally from at least one of the plurality of first sidewalls and supported by the inner wall, the ledge defining a first chamber and a second chamber within the shell; and
   a port providing an entry into the second chamber through the shell and the inner wall.

2. The device of claim 1 wherein the shell is formed from sheet metal.

3. The device of claim 2 wherein the sheet metal comprises aluminum.

4. The device of claim 2 further comprising a tab formed in the shell, the tab being capable of being bent from the shell to at least partially protrude from the shell.

5. The device of claim 2 further comprising at least one standoff, the standoff being formed into the bottom of the shell and capable of being bent from the bottom of the shell.

6. The device of claim 5 wherein the standoff includes a scored section defining a removable tab section of the standoff.

7. The device of claim 5 wherein the standoff has an overall length of about 6 inches.

8. The device of claim 7 further comprising a removable tab section of the standoff, the removable tab having a length of about 2 inches.

9. The device of claim 1 wherein the shell of the inner wall comprise plastic, the inner wall being integrally molded with the shell.

10. The device of claim 1 wherein the surrounding medium is poured concrete.

11. A device for forming a void in a poured concrete pavement, the device comprising:
    an aluminum sheet metal shell having a plurality of first sidewalls extending orthogonally from a bottom, the bottom having at least one standoff, the standoff being formed in the bottom of the shell and capable of being bent from the bottom of the shell to provide support for the shell on a pavement base, at least one of the plurality of first sidewalls having a tab, the tab being formed in the at least one of the plurality of first sidewalls and capable of being bent from the at least one of the plurality of first sidewalls to anchor the device in the poured concrete pavement;
    an inner wall and ledge assembly formed from sheet metal and having a plurality of second sidewalls substantially parallel with the first sidewalls, and a ledge extending substantially laterally from at least one of the plurality of second sidewalls, the inner wall and ledge assembly being disposed within the aluminum sheet metal shell, wherein the ledge defines a first chamber and a second chamber within the shell; and
    a port providing an entry into the second chamber through the shell and the inner wall and ledge assembly.

12. An assembly comprising:
    a poured concrete structure;
    a preform disposed in the poured concrete structure to form a void within the poured concrete structure, the void having an open face co-extensive with a surface of the concrete structure, the void-forming preform including a first chamber suitable for receiving a light fixture, a second chamber, a ledge disposed between the first chamber and the second chamber, and at least one standoff bent to extend substantially laterally from a bottom of the preform;
    electrical wiring running underneath the surface of the concrete structure and into the second chamber, the electrical wiring being capable of providing power to the light fixture; and
    a length of electrical wiring within the second chamber sufficient, when coupled to the light fixture, to allow removal of the light fixture from the preform without disconnecting the light fixture from the wiring.

13. The assembly of claim 12 wherein the preform further includes at least one anchoring tab extending substantially laterally at approximately a right angle from a wall of the preform into the poured concrete structure.

14. A method of forming a pavement including steps of:
    (a) forming a pavement base;
    (b) bending a tab to extend a selected length from a bottom of a light fixture preform;
    (c) setting the light fixture preform above the pavement base on the tab, the light fixture preform having an upper chamber suitable for receiving a light fixture, a lower chamber suitable for receiving a length of electrical wiring, an interior ledge disposed between the upper chamber and the lower chamber, and a port allowing access into a the lower chamber;

(d) running the length of electrical wiring into the light fixture preform through the port, the length of electrical wiring being sufficient to remove the light fixture from the light fixture preform when the light fixture is coupled to the electrical wiring; and (e) forming the pavement around the light fixture preform and the electrical wiring.

15. The method of claim 14 wherein the pavement is a poured concrete structure and the step 13(e) of forming the structure includes pouring concrete.

16. The method of claim 14 further comprising the step of connecting a light fixture to the electrical wiring.

* * * * *